(12) United States Patent
Thakare et al.

(10) Patent No.: US 11,775,549 B2
(45) Date of Patent: Oct. 3, 2023

(54) METHOD AND SYSTEM FOR DOCUMENT INDEXING AND RETRIEVAL

(71) Applicant: Tata Consultancy Services Limited, Mumbai (IN)

(72) Inventors: Shreya Sanjay Thakare, Mumbai (IN); Saswati Soumya Tripathy, Bangalore (IN); Pranav Champaklal Shah, Mumbai (IN); Sudhakara Deva Poojary, Mumbai (IN); Rahul Rana, Mumbai (IN); Hemil Patel, Pune (IN); Saad Ansari, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 26 days.

(21) Appl. No.: 17/682,246

(22) Filed: Feb. 28, 2022

(65) Prior Publication Data

US 2022/0342896 A1  Oct. 27, 2022

(30) Foreign Application Priority Data

Mar. 18, 2021  (IN) .............................. 202121011653

(51) Int. Cl.
*G06F 17/30* (2006.01)
*G06F 16/25* (2019.01)
*G06F 16/22* (2019.01)

(52) U.S. Cl.
CPC ........ *G06F 16/254* (2019.01); *G06F 16/2246* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 2004/0193596 A1* | 9/2004 | Defelice | G06F 16/345 707/999.005 |
| 2009/0144609 A1* | 6/2009 | Liang | G06F 40/284 707/999.005 |

(Continued)

OTHER PUBLICATIONS

Abolhassani et al., "Extracting Topics from Semi-structured Data for Enhancing Enterprise Knowledge Graphs," ICST Institute for Computer Sciences, Social Informatics and Telecommunications Engineering (2019).

(Continued)

*Primary Examiner* — Hung D Le
(74) *Attorney, Agent, or Firm* — Finnegan, Henderson, Farabow, Garrett & Dunner LLP

(57) ABSTRACT

Existing systems for document processing are either based on a supervised approach using annotated tags, and these systems identify section-based data from the unstructured documents without considering the statistical variations in content, which results in highly inaccurate content extraction. The disclosure herein generally relates to document processing, and, more particularly, to method and system for document indexing and retrieval. The system provides a mechanism to correlate unique words in a document with different topics identified in the document, based on a word pattern identified from the document. The correlations are captured in a knowledge graph, and can be further used in applications such as but not limited to document retrieval.

9 Claims, 5 Drawing Sheets

(56) References Cited

U.S. PATENT DOCUMENTS

2016/0048482 A1 2/2016 Tsui
2020/0394243 A1* 12/2020 Blackman ........... G06F 16/9535

OTHER PUBLICATIONS

Newman et al., "Automatic Evaluation of Topic Coherence," Human Language Technologies: The 2010 Annual Conference of the North American Chapter of the ACL (2010).

* cited by examiner

METHOD AND SYSTEM FOR DOCUMENT INDEXING AND RETRIEVAL

PRIORITY CLAIM

This U.S. patent application claims priority under 35 U.S.C. § 119 to: India Application No. 202121011653, filed on Mar. 18, 2021. The entire contents of the aforementioned application are incorporated herein by reference.

TECHNICAL FIELD

The disclosure herein generally relates to document processing, and, more particularly, to method and system for document indexing and retrieval.

BACKGROUND

Document indexing and retrieval is a major requirement in any industry/domain in which huge size of data need to be handled. For example, organizations belonging to different business domains who provide support to their users with customer support are required to handle customer data as well as organizational data. Employees at call centers, research centers, product companies have to perform tedious task of scanning humongous amount of data to answer customer queries. This is true for different industries such as but not limited to E-commerce, Education, Pharma, Tourism, and IT.

Existing systems for document processing are based on supervised approach using annotated tags, which comes with conditions such as but not limited to uniform and predefined text parameters like font size, and font style, for document processing. Such systems identify section-based data from the unstructured documents without considering the statistical variations in content which results in highly inaccurate content extraction.

SUMMARY

Embodiments of the present disclosure present technological improvements as solutions to one or more of the above-mentioned technical problems recognized by the inventors in conventional systems. For example, in one embodiment, a processor implemented method of document processing is provided. In this process, initially a document is collected as input, via one or more hardware processors. Further, the document is pre-processed via the one or more hardware processors, to generate a pre-processed document. Further, one or more topics in the pre-processed document are identified. Further, a plurality of unique words in the pre-processed document are identified. Further, a plurality of phrases and word patterns in the pre-processed document are identified. Further, each of the plurality of the unique words is correlated to corresponding at least one topic, based on the determined word patterns. Further, a knowledge graph is built using the correlation of the plurality of the unique words with the corresponding at least one topic.

In another aspect, a system for document processing is provided. The system includes a memory storing instructions, one or more communication interfaces, and one or more hardware processors coupled to the memory via the one or more communication interfaces. The one or more hardware processors are configured by the instructions to initially collect a document as input. The system then pre-processes the document to generate a pre-processed document. Further, one or more topics in the pre-processed document are identified by the system. Further, the system identifies a plurality of unique words in the pre-processed document. Further, a plurality of phrases and word patterns in the pre-processed document are identified. Further, each of the plurality of the unique words is correlated to corresponding at least one topic, based on the determined word patterns. Further, a knowledge graph is built using the correlation of the plurality of the unique words with the corresponding at least one topic.

In yet another aspect, a non-transitory computer readable medium for document processing is provided. The non-transitory computer readable medium contains a plurality of instructions, which when executed, causes the document processing via the following steps. In this process, initially a document is collected as input, via one or more hardware processors. Further, the document is pre-processed via the one or more hardware processors, to generate a pre-processed document. Further, one or more topics in the pre-processed document are identified. Further, a plurality of unique words in the pre-processed document are identified. Further, a plurality of phrases and word patterns in the pre-processed document are identified. Further, each of the plurality of the unique words is correlated to corresponding at least one topic, based on the determined word patterns. Further, a knowledge graph is built using the correlation of the plurality of the unique words with the corresponding at least one topic.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
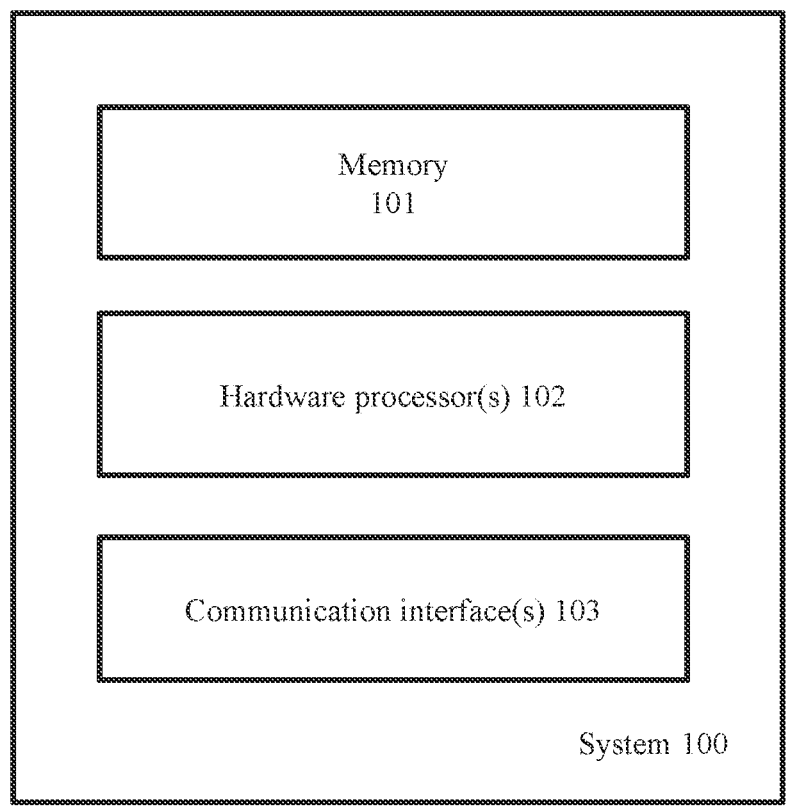
FIG. 1 illustrates an exemplary system for document processing, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary system for document processing, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the document processing being performed by the system 100. Various steps involved in the process of document processing being performed by the system 100 of FIG. 1 are depicted in FIG. 2 through FIG. 5, and are explained with reference to the hardware components depicted in FIG. 1.

Figure 2:
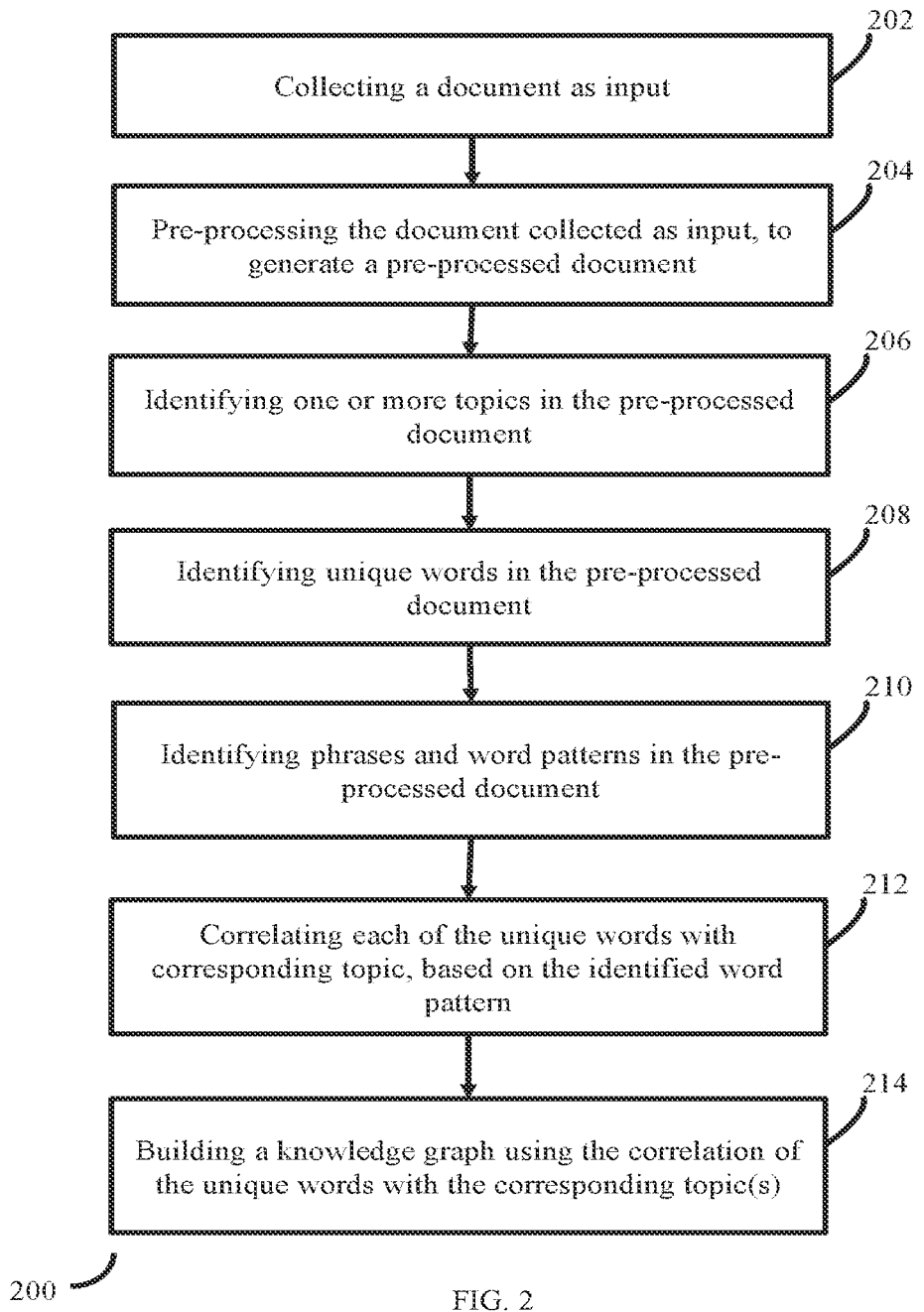
FIG. 2 is a flow diagram depicting steps in the method of document processing, by the system of FIG. 1, according to some embodiments of the present disclosure.
Figure 3:
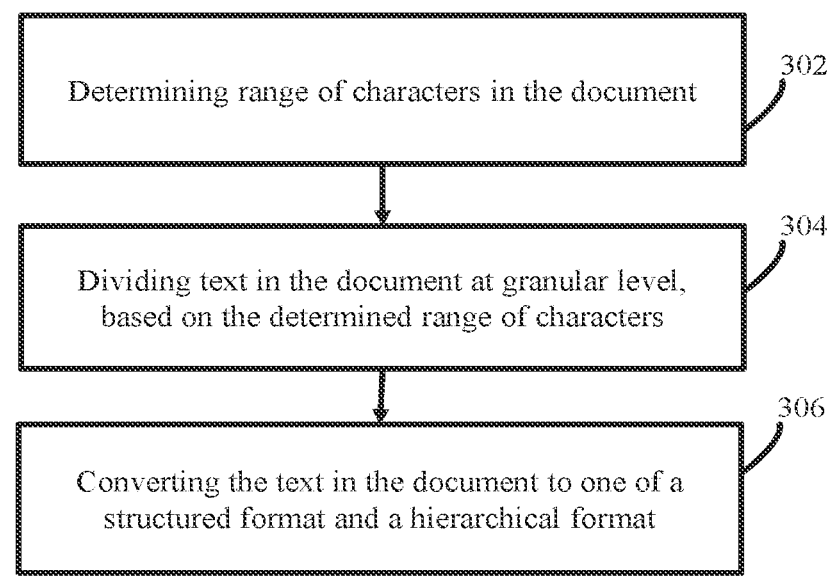
FIG. 3 is a flow diagram depicting steps in the method of pre-processing the document, by the system of FIG. 1, according to some embodiments of the present disclosure.

FIG. 2 is a flow diagram depicting steps in the method of document processing, by the system of FIG. 1, according to some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the additional steps of flow diagrams as depicted FIG. 3, and FIG. 4. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the system 100 collects a document as input. The document may be in any format, for example, pdf, pptx, docx and txt and so on. In various embodiments, the document may be fed to the system 100 using a suitable interface provided, or the system 100 may be configured automatically fetch the document from a source that is connected to the system 100 via a suitable interface.

At step 204, the system 100 pre-processes the document, to generate a pre-processed document. By pre-processing the document, the system 100 converts the document to a format that can be further processed for indexing. Various steps involved in the process of pre-processing the document are depicted in method 300 in FIG. 3. At step 302, the system 100 determines a range of characters in the document. At this step, the system 100 crawls over the document using suitable crawling technique(s) and extracts values of various parameters such as but not limited to size, capitalized words, Title words, style like bold, and normal. Based on the extracted values of the different parameters, the system 100 plots a distribution graph, and from the distribution graph, a range of character distribution is determined. The system 100 then, at step 304, divides the text in the document at granular levels, based on the determined range of characters. Further, at step 306, the system 100 converts the text in the document to one of a structured format and a hierarchical format, using appropriate data processing mechanism.

In addition, the pre-processing of the document may also involve a) identifying relevant content from the document by scanning the document, b) creating a normal distribution over the determined range of characters, and c) eliminating irrelevant sections in the document. Identifying the relevant sections in the document involves the following steps. The system 100 normalizes a mean distribution of the document and takes a mean value as reference for calculating an overall threshold. The overall threshold indicates/represents a minimum number of any of the parameters such as but not limited to capitalized words, title words, and style like bold, normal, that is required in a section of the document so that the section can be considered as a relevant section by the system 100. If the number of parameters being considered exceed the overall threshold for any section, the system 100 considers that section as relevant, and if otherwise, as irrelevant. By comparing the overall threshold value with the parameters such as but not limited to capitalized words, title words, and style like bold, normal, the system 100 determines different sections/portions in the document as relevant and irrelevant sections. For example, the document may contain header, footer, index page and so on, which do not contain any parameter that belong to the mentioned types, and hence the number of parameters could be less than the overall threshold. Hence the system 100 may determine the header, footer, index page and so on as irrelevant sections and then eliminate/remove. However, for paragraphs in the document, the number of parameters may be exceeding the overall threshold, and hence the system 100 determines the paragraphs as relevant sections. A statistical approach that may be used by the system 100 for identifying the relevant contents, and in turn the relevant sections, is explained below:

The document d is divided into T blocks/sections. Consider that number of title words of ith block is nci (where, i ranges from 1 to T). The values of the various parameters/characteristics are extracted at this stage, and these values are used to plot a distribution graph which is further used to determine the range of character distribution.

Ratio to maximum size is a value that is indicative of category of each of the sections in the document i.e. whether the section is a heading, sub-heading, paragraph, header, or footer etc., and is defined for the entire document as:

$$RMED = \frac{f_{si}}{\max T}$$

where, max font size=$\max(f_{s1}, f_{s2}, \ldots, f_{si}, \ldots f_{sT})$ and $f_{si}$ refers to font size of $i^{th}$ block.

The system 100 further checks if RMED and a percentage capital count (pcc)>=threshold value, where threshold value is automatically calculated based on highest character size in document. For each section in the document, the pcc value represents percentage of capitalized count in comparison with total number of words in the section. The capitalized count is measured in terms of number of title words, block words, and capitalized words in the section. If the aforementioned condition is true, then the $i^{th}$ block is qualified as heading else $i^{th}$ block is determined as in a paragraph.

Now if $i^{th}$ block is qualified for heading:
if ($f_{si}$~max font size) then $i^{th}$ block will be heading otherwise it will be subheading.

The system 100 then performs pattern recognition to achieve elimination of index/table of contents. In various embodiments, the system 100 may perform the pattern recognition by considering all pages in the document at once, or based on contents from a certain number (n) of pages, wherein value of n may be pre-configured with the system 100. In the pages being considered, the system 100 identifies frequency of numeric data and non-numeric data and their pattern of occurrences is determined. Based on the pattern of occurrences, the relevant contents are identified. The system 100 may then eliminate/remove the irrelevant sections in the document, such that only the relevant sections are included in the pre-processed document that is to be processed in subsequent steps.

Further, at step 206, the system 100 identifies one or more topics in the pre-processed document that contains the relevant sections. The system 100 may use a stochastic process to identify the topics. The system 100 calculates value of number of topics (T) as:

$$T = \begin{cases} \sqrt{N}, & \text{if } \sqrt{N} < m \\ m, & \text{if } \sqrt{N} \geq m \end{cases}$$

where, m=upper bound threshold

After calculating the number of topics (T), the system 100 uses a suitable topic modeling technique to identify all the n topics.

Further, at step 208, the system 100 identifies unique words in the pre-processed document. At this stage, the system 100 determines a part of speech for the entire document and then extracts a plurality of relevant linguistic characteristics based on the different categories of the part of speech. The unique words are then identified and extracted from the linguistic characteristics. For example, consider the statement:—"The Telegraph Group says the cuts are needed to fund an £150 m investment in new printing facilities. Journalists at the firm met on Friday afternoon to discuss how to react to the surprise announcement.". During the processing of this statement, the system 100 initially eliminates vowels, prepositions, verbs and conjugation (words like the, are, to, in etc. in the example statement). After filtering out these words, resulting statement is "Telegraph Group says cuts needed fund £150 m investment new printing facilities. Journalists firm met Friday afternoon discuss react surprise announcement". Further, from this statement, all the non-repeating words are identified as the unique words by the system 100.

Based on the number of unique words, the system 100 determines total words in each topic as:

$$n = W \times 0.01,$$

where, W=total number of unique words in corpus.

At step 210, the system 100 identifies phrases and word patterns in the pre-processed document. The system 100 may identify the phrases and word patterns, based on a semantic structure deduced from the text in the pre-processed document. At this step, the system 100 identifies correlation between the unique words from each topic. This correlation specifies a semantic structure of the corpus by identifying the pattern of occurrences of each word with every other word from the topic. Using this correlation and the pattern of occurrences statistics a Knowledge Graph is created. Further, from the Knowledge Graph, combination of words having value of correlation exceeding a threshold of correlation are identified as words forming a phrase. The system 100 at this stage determines correlation of each of the unique words with every other unique word from the topics selected.

Further, at step 212, the system 100 correlates each of the unique words with corresponding at least one topic, based on the word patterns identified at step 210. This process is repeated till all the unique words are correlated with at least one topic. The correlation between a unique word and a corresponding topic specifies the semantic structure of the data corpus by identifying the pattern of occurrences of each word with every other word from the topic. The system 100 may determine the correlation between the words in terms of a co-occurrence frequency and statistics between the words. The system 100 may determine the correlation from a topic modeling output by calculating the occurrence frequency of each word with every other word from each topic. The co-occurrence frequency of two unique words represents number of co-occurrences of the two words. In various embodiments, the system 100 considers two unique words as co-occurring if they are part of the same sentence or if they are adjacent to each other in the sentences considered. The system 100 may also be configured to assign different weightages to the co-occurrences. For example, two unique words being adjacent to each other in a sentence being considered may get higher weightage than the two unique words being part of the same sentence and not being adjacent to each other.

Further at step 214, the system 100 builds a knowledge graph that captures information on the correlation of each of the unique words with the corresponding topic(s). In addition to the correlation between the unique words and the corresponding topics, the knowledge graph may also contain information on one or more documents that contain text matching the one or more of the topics and which may contain one or more of the unique words. For example, consider a dataset of 2000 news articles. The news-articles belonged to 5 different sub-domains—Economy, entertainment, politics, sports and technology. The system 100 determines various hyper-parameters automatically using the method 200. As a result, coherence score of 0.44 was achieved, which is ideally higher to determine the optimal values of hyper-parameters. This helps to build knowledge graphs with higher accuracy. The knowledge graphs may be then used to perform document retrieval which helps in improvising the performance of overall system. This way the documents are indexed. The knowledge graph may be then stored in a database in the memory, and may be used for document retrieval and other applications.

Figure 4:
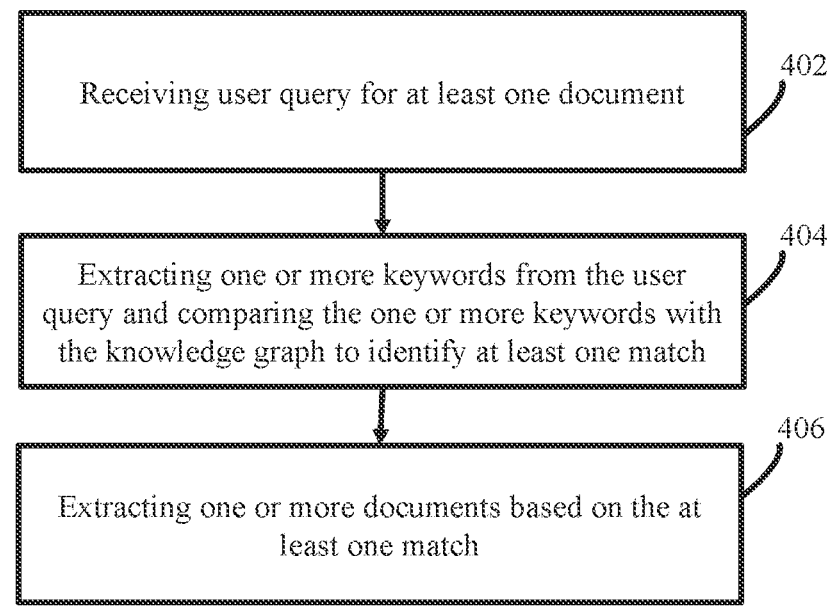
FIG. 4 is a flow diagram depicting steps in the method of document retrieval, by the system of FIG. 1, according to some embodiments of the present disclosure.

FIG. 4 is a flow diagram depicting steps in the method of document retrieval, by the system of FIG. 1, according to some embodiments of the present disclosure. At step 402, the system 100 receives/collects a user query. The user query may specify what kind of documents are being searched for, and may contain one or more keywords. At step 404, the system 100 extracts the one or more keywords from the user query, using suitable text processing technique(s) and compares the extracted one or more keywords with the knowledge graph stored in the memory 101 to find/identify at least one matching unique word or topic. If the at least one match is identified, then at step 406, the system 100 extracts one or more documents based on the at least one match, i.e. the documents that are associated with the matching unique word or topic are extracted, and may be then provided to the user as search result.

Example Implementation

Figure 5:
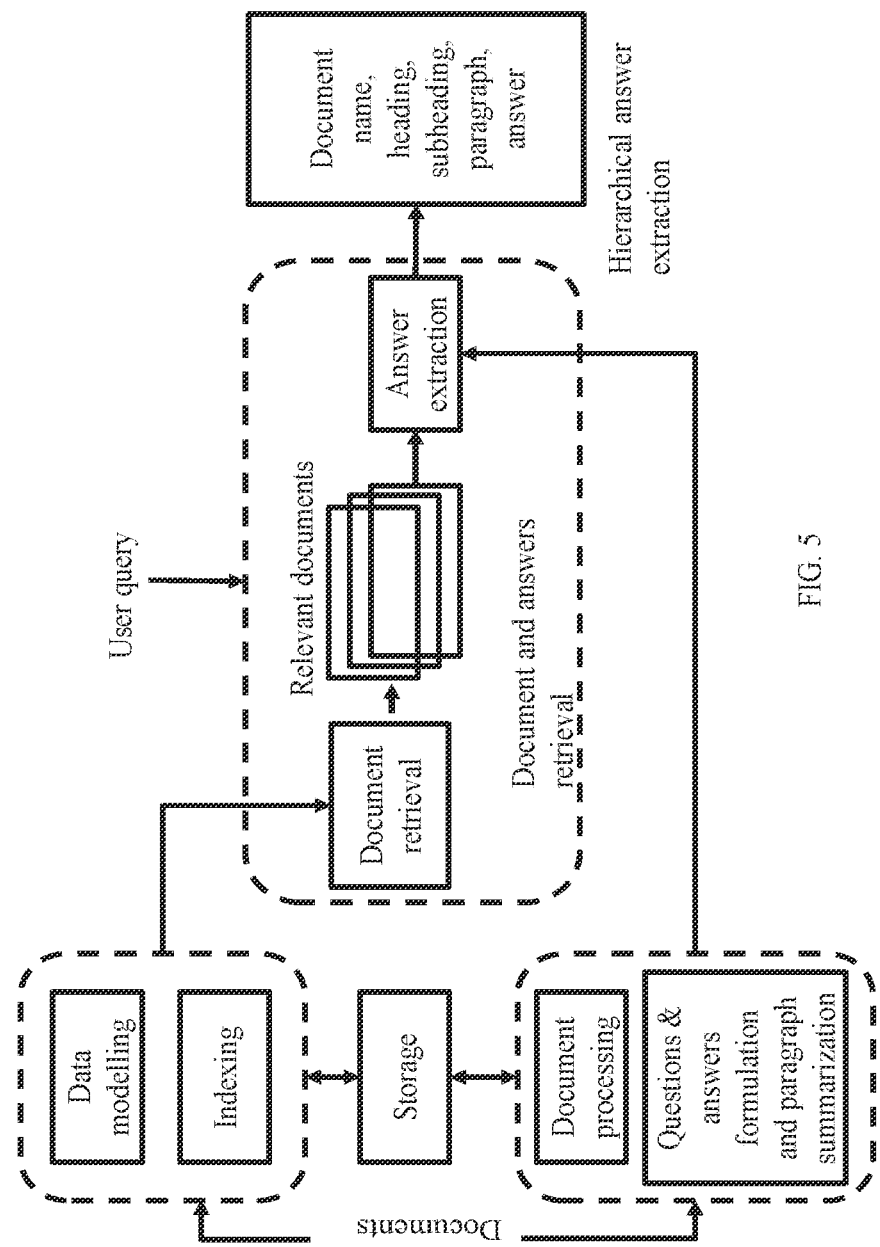
FIG. 5 is an example implementation of the system of FIG. 1, according to some embodiments of the present disclosure.

The example is described with reference to FIG. 5, which is an example implementation of the system 100. FIG. 5 describes the flow and communication within the modules and sequence of activities. Input to the system in FIG. 5 are files which consists of diverse file formats (.pdf, pptx, docx and txt etc.). For example, these files are considered to be a set of 2000 news articles, wherein the news articles containing data from 5 different sub-domains—Economy, entertainment, politics, sports and technology.

These input documents are first passed to a document processing unit, which uses the mechanism of identifying relevant contents as described in method 200 to extract the relevant contents from the documents. Once the relevant sections are identified and extracted, data from the relevant sections are used for generating Question and Answer pairs.

The method of detecting the topics explained in method 200 is then used by the modelling and indexing module to perform data modelling and indexing. Input for this step may be either the data from the identified relevant sections, or raw files provided by the user in case the modelling and indexing module is implemented as a standalone module. By using the steps elaborated in method 200, the modelling and indexing module identifies abstract topics from the collections of documents. Then the knowledge graph is built from the identified correlations and patterns occurring in the topics.

The system then determines various hyper-parameters automatically using the statistic method described in method 200. As a result coherence score of 0.44 was achieved which is ideally higher to determine the optimal values of hyper-parameters.

Topics extracted by the modelling and indexing module was then used to determine the correlation by identifying the pattern of occurrences of each word with every other word from each topic. Correlation between the words is determined by the co-occurrence frequency and statistics between the words. This helps to build knowledge graphs with higher accuracy where nodes are the co-related words and edges being the frequency of co-occurrence of these words.

Knowledge graphs are then used to perform document retrieval which helps in improvising the performance of overall system.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of document indexing and retrieval. The embodiment, thus provides a mechanism to correlate unique words in a document with different topics identified in the document, based on a word pattern identified from the document. Moreover, the embodiments herein further provide a mechanism to retrieve documents matching a user query, based on the correlation captured in a knowledge graph.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of document processing, comprising:
    collecting a document as input, via one or more hardware processors;
    pre-processing the document, via the one or more hardware processors, to generate a pre-processed document, wherein pre-processing the document comprises:
        identifying relevant content from the document by: normalizing a mean distribution of the document and computing a mean value as a reference for calculating an overall threshold that indicate a minimum number of parameters required in a section of the document for the section to be a relevant section, and identifying the section to be relevant if the number of parameters exceed the overall threshold or identifying the section to be irrelevant if the number of parameters are less than the overall threshold; and
        eliminating irrelevant content in the document by: performing a pattern recognition for all pages in the document at once, or based on contents from a number of pages; identifying, in all the pages or in the contents from the number of pages, frequency of numeric data and non-numeric data; determining a pattern of occurrences of the numeric data and the non-numeric data; identifying the relevant content based on the pattern of occurrences; and eliminating the irrelevant content in the pre-processed document;
    identifying one or more topics in the pre-processed document;
    identifying a plurality of unique words in the pre-processed document;
    identifying a plurality of phrases and word patterns in the pre-processed document;
    correlating each of the plurality of the unique words to corresponding at least one topic, based on the identified word patterns, and determining the correlation between each of the plurality of unique words based on a co-occurrence frequency and statistics between each of the plurality of unique words, wherein the correlation is determined by: calculating the co-occurrence frequency of each word with every other word from the at least one topic, and assigning different weightages to the co-occurrences such that two words adjacent to each other in a sentence have higher weightage than two words that are not adjacent to each other; and
    building a knowledge graph using the correlation of the plurality of the unique words with the corresponding at least one topic, and using the knowledge graph for performing document retrieval based on a user query, wherein nodes in the knowledge graph are co-related words and edges in the knowledge graph are the frequency of co-occurrence of the co-related words.

2. The processor implemented method as claimed in claim 1, wherein pre-processing the document comprises:
    determining range of characters in the document;
    dividing text in the document at a granular level, based on the determined range of characters; and
    converting the text in the document to one of a structured format and a hierarchical format,
    wherein determining the range of characters in the document comprises:
    dividing the document into a plurality of sections;
    calculating a ratio to maximum size in entire document, RMED, referring to a value indicative of a category of each section of the plurality of sections in the document, wherein the category is one of a heading, a sub-heading, a paragraph, a header, and a footer; and
    comparing the RMED and a percentage capital count, pcc, with a threshold value, wherein the threshold value is automatically calculated based on highest character size in the document.

3. The processor implemented method as claimed in claim 1, wherein document extraction, performed using the knowledge graph, comprising:
    receiving the user query for at least one document, wherein the user query comprises at least one keyword;
    comparing the at least one keyword with the knowledge graph to identify at least one match;
    extracting at least one document based on the at least one match; and
    providing, to the user, the at least one document in a hierarchical format with a document name followed by the heading, the subheading, and paragraph that matches the user query.

4. A system for document processing, comprising:
    a memory storing instructions;
    one or more communication interfaces; and
    one or more hardware processors coupled to the memory via the one or more communication interfaces, wherein the one or more hardware processors are configured by the instructions to:
    collect a document as input;
    pre-process the document to generate a pre-processed document, wherein to pre-process the document, the one or more hardware processors are configured by the instructions to:

identify relevant content from the document by: normalizing a mean distribution of the document and computing a mean value as a reference for calculating an overall threshold that indicate a minimum number of parameters required in a section of the document for the section to be a relevant section, and identifying the section to be relevant if the number of parameters exceed the overall threshold or the section to be irrelevant if the number of parameters are less than the overall threshold; and eliminate irrelevant content in the document by: performing a pattern recognition for all pages in the document at once, or based on contents from a number of pages; identifying, in all the pages or in the contents from the number of pages, frequency of numeric data and non-numeric data; determining a pattern of occurrences of the numeric data and the non-numeric data; identifying the relevant content based on the pattern of occurrences; and eliminating the irrelevant content in the pre-processed document;

identify one or more topics in the pre-processed document;

identify a plurality of unique words in the pre-processed document;

identify a plurality of phrases and word patterns in the pre-processed document;

correlate each of the plurality of the unique words to corresponding at least one topic, based on the identified word patterns, and determine the correlation between each of the plurality of unique words based on a co-occurrence frequency and statistics between each of the plurality of unique words, wherein to determine the correlation, the one or more hardware processors are configured by the instructions to: calculate the co-occurrence frequency of each word with every other word from the at least one topic, and assign different weightages to the co-occurrences such that two words adjacent to each other in a sentence have higher weightage than two words that are not adjacent to each other; and build a knowledge graph using the correlation of the plurality of the unique words with the corresponding at least one topic, and use the knowledge graph to perform document retrieval based on a user query, wherein nodes in the knowledge graph are co-related words and edges in the knowledge graph are the frequency of co-occurrence of the co-related words.

5. The system as claimed in claim 4, wherein the system pre-processes the document by:

determining range of characters in the document;

dividing text in the document at a granular level, based on the determined range of characters; and converting the text in the document to one of a structured format and a hierarchical format, wherein to determine the range of characters in the document, the one or more hardware processors are configured by the instructions to:

divide the document into a plurality of sections;

calculate a ratio to maximum size in entire document, RMED, referring to a value indicative of a category of each section of the plurality of sections in the document, wherein the category is one of a heading, a sub-heading, a paragraph, a header, and a footer; and compare the RMED and a percentage capital count, pcc, with a threshold value, wherein the threshold value is automatically calculated based on highest character size in the document.

6. The system as claimed in claim 4, wherein the system performs a document extraction using the knowledge graph, by:

receiving the user query for at least one document, wherein the user query comprises at least one keyword;

comparing the at least one keyword with the knowledge graph to identify at least one match;

extracting at least one document based on the at least one match; and provide, to the user, the at least one document in a hierarchical format with a document name followed by the heading, the subheading, and paragraph that matches the user query.

7. A non-transitory computer readable medium for document processing, wherein a plurality of instructions in the non-transitory computer readable medium when executed, cause:

collecting a document as input, via one or more hardware processors;

pre-processing the document, via the one or more hardware processors, to generate a pre-processed document, wherein pre-processing the document comprises:

identifying relevant content from the document by: normalizing a mean distribution of the document and computing a mean value as a reference for calculating an overall threshold that indicate a minimum number of parameters required in a section of the document for the section to be a relevant section, and identifying the section to be relevant if the number of parameters exceed the overall threshold or the section to be irrelevant if the number of parameters are less than the overall threshold; and eliminating irrelevant content in the document by: performing a pattern recognition for all pages in the document at once, or based on contents from a number of pages; identifying, in all the pages or in the contents from the number of pages, frequency of numeric data and non-numeric data; determining a pattern of occurrences of the numeric data and the non-numeric data; identifying the relevant content based on the pattern of occurrences; and eliminating the irrelevant content in the pre-processed document;

identifying one or more topics in the pre-processed document;

identifying a plurality of unique words in the pre-processed document;

identifying a plurality of phrases and word patterns in the pre-processed document;

correlating each of the plurality of the unique words to corresponding at least one topic, based on the identified word patterns, and determining the correlation between each of the plurality of unique words based on a co-occurrence frequency and statistics between each of the plurality of unique words, wherein the correlation is determined by: calculating the co-occurrence frequency of each word with every other word from the at least one topic, and assigning different weightages to the co-occurrences such that two words adjacent to each other in a sentence have higher weightage than two words that are not adjacent to each other; and building a knowledge graph using the correlation of the plurality of the unique words with the corresponding at least one topic, and using the knowledge graph for performing document retrieval based on a user query, wherein nodes in the knowledge graph are co-related words and edges in the knowledge graph are the frequency of co-occurrence of the co-related words.

8. The non-transitory computer readable medium as claimed in claim 7, wherein pre-processing the document comprises:
   determining range of characters in the document;
   dividing text in the document at a granular level, based on the determined range of characters; and
   converting the text in the document to one of a structured format and a hierarchical format,
   wherein determining the range of characters in the document comprises:
   dividing the document into a plurality of sections;
   calculating a ratio to maximum size in entire document, RMED, referring to a value indicative of a category of each section of the plurality of sections in the document, wherein the category is one of a heading, a sub-heading, a paragraph, a header, and a footer; and
   comparing the RMED and a percentage capital count, pcc, with a threshold value, wherein the threshold value is automatically calculated based on highest character size in the document.

9. The non-transitory computer readable medium as claimed in claim 7, wherein document extraction, performed using the knowledge graph, comprising:
   receiving the user query for at least one document, wherein the user query comprises at least one keyword;
   comparing the at least one keyword with the knowledge graph to identify at least one match;
   extracting at least one document based on the at least one match; and
   provide, to the user, the at least one document in a hierarchical format with a document name followed by the heading, the subheading, and paragraph that matches the user query.

* * * * *